United States Patent [19]

Matsumoto

[11] Patent Number: 5,432,902
[45] Date of Patent: Jul. 11, 1995

[54] METHOD OF SELECTING A MENU IN ACCORDANCE WITH A MAXIMUM CORRELATION BETWEEN A USER INPUT AND STORED PARAMETERS

[75] Inventor: Shunji Matsumoto, Tokyo, Japan

[73] Assignee: Fujitsu Limited, Kawasaki, Japan

[21] Appl. No.: 62,253

[22] Filed: May 17, 1993

Related U.S. Application Data

[63] Continuation of Ser. No. 845,842, Mar. 6, 1992, abandoned, which is a continuation of Ser. No. 380,288, Jul. 17, 1989, abandoned.

[30] Foreign Application Priority Data

Jul. 18, 1988 [JP] Japan ............................. 63-178547

[51] Int. Cl.⁶ .............................................. G06F 17/30
[52] U.S. Cl. ........................... 395/156; 395/155; 395/425; 395/160
[58] Field of Search ............... 364/DIG. 1, DIG. 2; 395/155-160, 147, 200, 425

[56] References Cited

U.S. PATENT DOCUMENTS

| | | | |
|---|---|---|---|
| 4,486,870 | 12/1984 | Pettigrew et al. | 369/32 |
| 4,689,737 | 8/1987 | Grant | 364/419.08 |
| 4,764,867 | 8/1988 | Hess | 395/160 |
| 4,816,994 | 3/1989 | Freiling et al. | 364/200 MS File |
| 4,823,306 | 4/1989 | Barbic et al. | 364/900 MS File |
| 4,899,292 | 2/1990 | Montagna et al. | 395/147 |
| 5,146,561 | 9/1992 | Carey et al. | 395/200 |

FOREIGN PATENT DOCUMENTS 0243671  3/1987  European Pat. Off. ........ G06F 3/02

OTHER PUBLICATIONS

T. Kaczmarek, "A Network Architecture for Intelligent Workstation Interfaces", Proceedings 1st International Conference on Computer Workstations, Nov. 11, 1985, San Jose, Calif., pp. 247-253.

European Search Report, The Hague, Jul. 6, 1992.

*Primary Examiner*—Almis R. Jankus
*Attorney, Agent, or Firm*—Staas & Halsey

[57] ABSTRACT

A method of selecting a menu in accordance with a maximum correlation between a user input and stored parameters. A user is prompted to input a description of the desired function to be performed by the program. Keywords are selected from the users input and correlation factors are developed between the user input keywords and each of the various menus items within the program. If a correlation factor exceeds a predetermined threshold value, then the menu associated with the maximum correlation factor is displayed. As a result, an inexperienced user can, by interacting with the program choose a menu corresponding the user's desired function for the program.

6 Claims, 2 Drawing Sheets

METHOD OF SELECTING A MENU IN ACCORDANCE WITH A MAXIMUM CORRELATION BETWEEN A USER INPUT AND STORED PARAMETERS

This application is a continuation of application Ser. No. 07/845,842, filed Mar. 6, 1992, now abandoned, which is a continuation of application Ser. No. 07/380,288, filed Jul. 17, 1989, now abandoned.

BACKGROUND OF THE INVENTION

The operation of many software programs requires that users input commands and/or data. Typically, a user can provide such inputs in the form of a command which directs the program to perform a function specified by the command. In such a case the user must know the syntax and function of each command. Inexperienced users frequently are not familiar with the function or syntax of the commands. Generally, programs of this type are denoted as command driven programs.

Alternatively, a user can provide the needed inputs in response to menus displayed by the program. Normally such programs provide a series of menus, each menu requesting a user to select a desired function or input particular data. Generally, such programs are called menu driven programs. For example, a menu would include a list of functions that can be selected and performed. The user selects by, for example, keyboard entries or through the use of a mouse, a desired function to be performed by the program. Inexperienced users, however, frequently do not understand or are not familiar with the various functions displayed in a menu.

Many programs allow users to provide inputs via either a menu, for the benefit of less experienced users, or commands used by more experienced users. In such systems, a user can typically request a list of all available commands through the use of, for example, a help function. Sometimes the help function displays a list of all available commands and permits a user to display the definition and syntax of any available command. Such a help function does not, however, assist an inexperienced user in determining when a menu or command should be used.

While menu driven programs may be useful for less experienced users, many complex systems such as expert systems employ detailed and extensive menus. Therefore, it can be very difficult for even experienced users to effectively utilize such systems because they do cannot understand or access the proper menu needed for their desired task.

SUMMARY OF THE INVENTION

It is an object of the present invention to provide a method that enables inexperienced program users to efficiently use complicated software programs.

It is another object of the present invention to provide a method that enables inexperienced program users to easily identify specific functions to be performed by a program.

It is a further object of the present invention to provide a method that prompts program users in a manner so that the user can be guided to an appropriate menu or command.

It is still a further object of the present invention to provide a method that prompts a user to input a description of the function that the user wishes to provide.

It is still a further object of the present invention to provide a method that compares key words inputted by a user with previously stored key words in order to guide the user to the appropriate menu or command.

In order to achieve the above and other objects, present invention provides a method of selecting one of a plurality of menus including menu items having parameters, said method comprising the steps of: a) receiving a user input string; b) selecting user input keywords from said user input string; c) correlating said user input keywords with said parameters of said menu items; and d) displaying a menu in accordance with said correlation.

DESCRIPTION OF THE PREFERRED EMBODIMENT

There are many types of menu driven programs such as word processing programs, data base programs and expert systems. In an expert system, for example, a first or high level menu would display menu items such as: diagnosing a problem, planning for a project, and designing a project. Each of these menu items would, in turn, have associated therewith a second or lower level menu with its own menu items. Other menu levels could be selected depending upon the system, for example, the detail of the knowledge base of an expert system.

Figure 1:
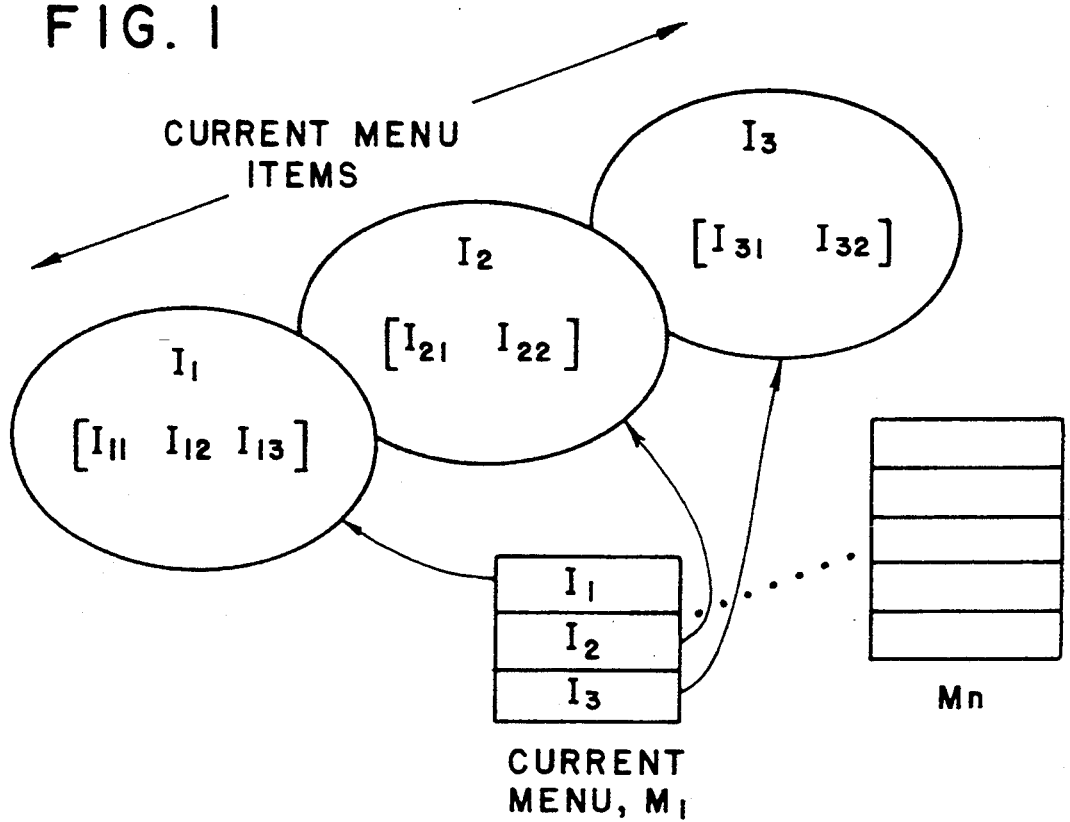
FIG. 1 is a schematic diagram illustrating the logical structure of a menu.
Figure 2:
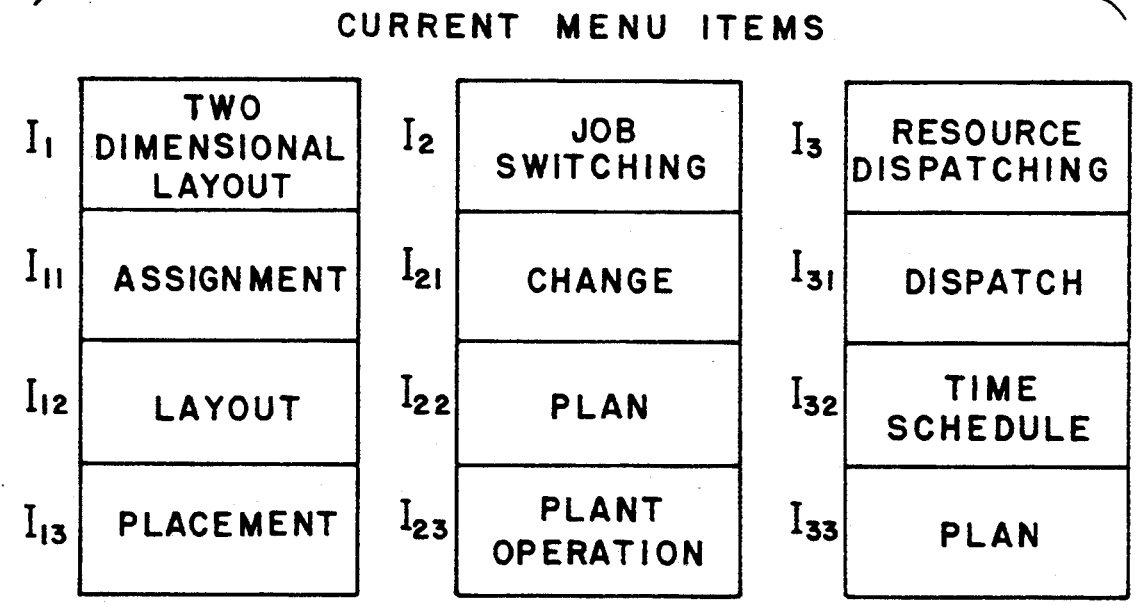
FIG. 2 is a schematic diagram illustrating the logical arrangement of parameters in current menu items.

FIG. 1 is a schematic diagram illustrating the logical structure of a menu. In FIG. 1, there are a number of menus, $M_1$ through $M_n$. Each menu includes a number of menu items such as $I_1$, $I_2$, $I_3$ shown in FIG. 1. Each menu item includes a list of key words or parameters such as $I_{11}$, $I_{12}$ and $I_{13}$. In an expert system, menu item $I_1$ could correspond to the function of designing a layout of a house or condominium. In such case, the parameters or menu items for the layout function could include the assignment of the floor plan space, corresponding to key word $I_{11}$, the general layout of the rooms corresponding to key word $I_{12}$ and the placement of the rooms corresponding to key word $I_{13}$. This is schematically shown in FIG. 2. An experienced user of such a system can easily select one of the available menus and sequentially select the desired submenus.

Figure 3:
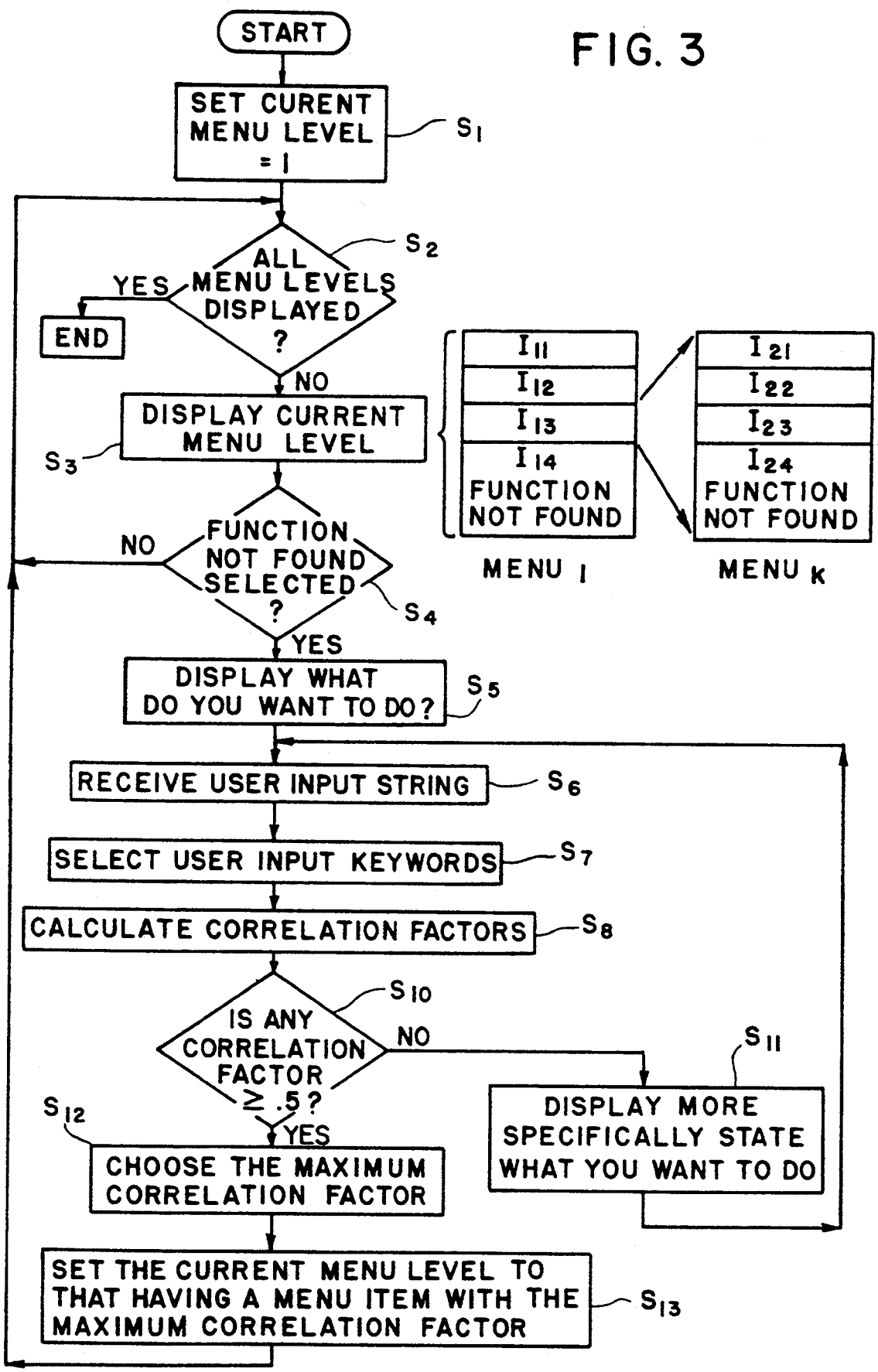
FIG. 3 is a flow chart illustrating the overall logic of a program embodying the present invention.

However, if a user is unfamiliar with the functions or capabilities of the system, menus are commonly of little assistance in effectively using the program. The present invention provides a method that accepts input a user string. Such a string comprises, for example, common English text such as "design the floor plan for a condominium." Using a dictionary including prepositions and articles, such words are deleted from the user input string leaving user input keywords "design, floor, plan, condominium. The user input keywords are then matched/analyzed with the parameters or keywords of each menu item of each menu. As a result, if parameters of a menu item can be identified as correlating the user input keywords, then the menu including the menu item having the parameters that correlate is displayed for the user. Referring to FIG. 3, upon starting of a menu driven program in accordance with the present invention, the current menu level is set to the first or highest level in step $s_1$. Step $s_2$ determines if all of the menu levels have been displayed for the user. If all of the menu level have been displayed, then the user has completed the desired function and execution of the program ends. If, however, all of the menus have not been displayed, the current menu is displayed in step $s_3$. If an experienced user recognizes the menu and knows how to use the menu, then the individual items within the menu can be selected by such a user such as menu items $I_{13}$, and $I_{21}$, in menus 1 and k respectively as shown in FIG. 3.

If an inexperienced user does not understand the displayed menu, then that user would select menu item $I_{14}$—function not found. This indicates that the user did not understand the functions displayed in menu 1 shown in FIG. 3. Thus, in step $s_4$ processing would proceed to step $s_5$. If the user selected one of the other menu items ($I_{11}$, $I_{12}$ or $I_{13}$), then in step $s_4$ processing would return to step $s_2$. In step $s_5$, the user is prompted with a message such as "What do you want to do? I want to:" The user would then input text describing the desired function. For example, as discussed above, the user could input "design the floor plan for a condominium." This user input string is received in step $s_6$.

Step $s_7$ selects the user input keywords from the user input string. For example, a dictionary including common articles and prepositions can be used to remove such words from the user input string, leaving the user input keywords. In step $s_8$, a correlation factor between the user input keywords and the parameters or keywords of each menu item for each menu is calculated. Table 1 shown below provides one example of a procedure for determining a correlation factor between the user input keywords and each set of parameters for each menu item. As will be recognized by those skilled in the art, there are alternative methods for determining correlation factors. Table 1 merely presents one such approach in a LISP type format.

TABLE 1

DATA STRUCTURE

```
;keys = (key1 key2 . . .): user input keywords
;items = (item1 item2 . . .): current menu items
;item-list = (item1 item-key1 item key2 . . .)
;item-lists = ((item1 item-key11 item-key12 . . .)
              (item2 item-key21 item-key22 . . .)
;************************************************************************
;Returns ((ITEM1 CF1) (ITEM2 CF2) . . .) for all i CFi > Threshold
;************************************************************************
```

SEARCHING ITEMS HAVING CF
VALUE GREATER THAN THRESHOLD

```
(defun get-nearest-items (keys item-lists & optional (threshold 0.5)
    (Let ((result niL))
    (doList (item-List item-Lists results)
       (Let*((item (car item-List))
             (cf (compute-cf item keys (cdr item-List))))
          (if (< threshold cf) (push (List item CF) result))))))
```

COMPUTATION OF CF VALUE FOR EACH ITEM BY
COMPARING EACH KEY AND ITEM-KEY IN THE ITEM-LIST

```
(defun compute-cf (*item* keys item-keys & optional
                   (rules-name 'standard))
   (declare (special *item*))
   (putprop *item* 0.0 'CF)          ; initial value of CF
   (if (equal keys item-keys)        ; similarity at LIST level
       (putprop *item* 1.0 'CF)      ; complete match
       (Let*((N1 (length keys))
             (N2 (length item-keys))
             (*weight* (/ (+ N1 N2)) (+ (* N1 N2) 1))))
          (declare (special *weight*))
          (doList (key keys (get *item* 'CF))   ; return value is CF
             (doList (item-key item-keys)
                (if (equal key item-key)         ; similarity at WORD level
                    (CF-is (/ 3 4))
                    (apply-rules key item-key rules-name)))))))
                                                 ; similarity at CHAR level
```

COMPARISON BETWEEN KEY AND ITEM-KEY
IN CHARACTER BY CHARACTER BASIS

```
(defun apply-rules (key item-key rules-name)
   (Let ((rules (get '*matching-rules* rules-name))
         (*key1* key)
         (*Len1* (string-length key))
         (*key2* item-key)
         (*Len2* (string-length item-key))
         (declare (special *key1* *key2* *Len1* *Len2*))
   (when (< *Len2* *Len1*)
      (psetq *key1* *key2* *key2* *key1* ; swap *key1* *key2*
             *Len1* *Len2* *Len2* *Len1* ; swap *Len1* *Len2*
   (mapc (function eval) rules)))      ; apply rules to get similarity
*************************************************************************
Rules are stored in parameters of the symbol *matching-rules*
user can add rules by using defprop as follows
*************************************************************************
```

DEFINITION OF THE "MATCHING-RULES"
FOR CHARACTER BY CHARACTER COMPARISON

```
(defprop *matching-rules*
   ((do ((i 0 (+ i 1)) (end (1- *Len1*)))
        ((< end i))
```

TABLE 1-continued

```
    (if (string-search (substring *key1* i (+ i 1)) *key2*)
        (CF-is (/ 0.7 *Len1*)))
    (if (and (<= I (− end 1))
            (string-search (substring *key1* i (+ i 2)) *key2*))
        (CF-is (/ 1.0 *Len1*)))
    (if (and (<= I (− end 2))
            (string-search (substring *key1* i (+ i 3)) *key2*))
        (CF-is (/ 1.5 *Len1*)))))
standard)
```

FORMULA FOR ACCUMULATING OLD AND NEW CF VALUES

```
(defun CF-is (current-cf)
    (Let((CF0 (get *item* 'CF))          ; old value
        (CF1 (* current-cf *weight*)))   ; new value
    (putprop *item* (− (+ CF0 CF1)  (* CF0 CF1)) 'CF))))
                                         ; replace CF to (CF0+CF1−CF0*CF1)
```

In step $s_{10}$, the program determines if any of the calculated correlation factors are greater than a predetermined threshold such as, for example, 0.5. The predetermined threshold can be any value depending upon the amount of certainty desired before displaying a menu for a user. If no correlation factor is greater than the predetermined threshold value, then processing proceeds to step $s_{11}$. In step $s_{11}$, the user is prompted to more specifically state what the user wants to do, and processing returns to step $s_6$ as shown in FIG. 3.

If one or more correlation factors are greater than or equal to the predetermined threshold value, then processing proceeds from step $s_{10}$ to step $s_{12}$ which chooses the maximum correlation factor. Next, in step $s_{13}$, the current menu is set to that menu level including the menu item having the maximum correlation factor. Consequently, when processing returns to step $s_3$, a menu is displayed which has a high correlation between the functions of the menu and the desired function inputted by the user in step $s_6$. By repeating steps $s_4$ through $s_{11}$, the program assists a user in selecting an input string that closely resembles the parameters for one of the menu items in the menus for the program. Thus, an inexperienced user, by interacting with the program in a manner described above can select an appropriate menu with a minimal amount of knowledge of the system and its capabilities.

The above describes the invention in the context of a particular embodiment. The scope of the present invention, however, is not limited to this particular embodiment and, instead is defined by the following claims.

I claim:

1. A method of selecting one of a plurality of menus, comprising the steps of:
   (a) storing a hierarchical relationship defining a hierarchy of the menus, with each of the menus including menu items having parameters;
   (b) receiving a user input string;
   (c) selecting user input keywords from said user input string;
   (d) correlating said user input keywords with said parameters of said menu items, including the substeps of
      (d1) determining a correlation factor between each of said parameters and said user input keywords;
      (d2) determining if the correlation factor is greater than a predetermined threshold for each of the parameters; and
      (d3) determining a maximum correlation factor if said determining in step (d2) determines that at least one of the parameters has a correlation factor larger than the predetermined threshold; and
   (e) displaying one of the plurality of menus based on said correlating.

2. A method according to claim 1, wherein step (e) includes the substeps of:
   (e1) determining the menu associated with a menu item whose parameters have the maximum correlation factor with the user input keywords; and
   (e2) displaying the menu determined in step (e1).

3. A method according to claim 1, further comprising the steps of:
   (f) prompting a user to input a more specific user input string when said determining in step (c2) determines that the correlation factor of none of the menu items is greater than the predetermined threshold;
   (g) receiving a more specific user input string; and
   (h) repeating steps (c)–(e) using the more specific user input string.

4. A method of selecting one of a plurality of menus listing alternative menu items for control of a data processing system, comprising the steps of:
   (a) storing a hierarchical relationship defining a hierarchy of the menus, with each of the menus including menu items having parameters;
   (b) displaying one of the menus as a current menu;
   (c) receiving a user input string;
   (d) selecting user input keywords from said user input string;
   (e) determining a correlation factor between said user input keywords and said parameters of each of said menu items of the current menu displayed in step (a);
   (f) selecting a maximum correlation factor; and
   (g) setting the current menu to a corresponding menu associated with the maximum correlation factor.

5. A method of selecting one of a plurality of menus, comprising the steps of:
   (a) storing a hierarchical relationship defining a hierarchy of the menus, with each of the menus including menu items having parameters;
   (b) displaying one of the menus as a current menu;
   (c) receiving a user input string;
   (d) selecting user input keywords from said user input string;
   (e) determining a correlation factor between said user input keywords and said parameters of each of said menu items of the current menu displayed in step (a);
   (f) selecting a maximum correlation factor;

(g) setting the current menu to a corresponding menu associated with the maximum correlation factor;
(h) determining if one of the menu items is selected in response to said displaying in step (b);
(i) setting the current menu to a lower level menu if the one of the menu items selected in step (h) is associated with the lower level menu, instead of performing steps (c)-(g); and
(j) repeating said displaying in step (b) after said setting in either of steps (g) and (i).

6. A method of selecting one of a plurality of menus, comprising the steps of:
(a) storing a hierarchical relationship defining a hierarchy of the menus, with each of the menus including menu items having parameters;
(b) displaying one of the menus as a current menu;
(c) receiving a user input string;
(d) selecting user input keywords from said user input string;
(e) determining a correlation factor between said user input keywords and said parameters of each of said menu items of the current menu displayed in step (a);
(f) selecting a maximum correlation factor;
(g) setting the current menu to a corresponding menu associated with the maximum correlation factor;
(h) determining if the correlation factor is at least equal to a predetermined threshold for each of the parameters; and
(i) requesting elaboration of the user input string received in step (c), instead of performing steps (f) and (g), if the correlation factor of each of the parameters is less than the predetermined threshold.

* * * * *